Patented Mar. 13, 1945

2,371,281

UNITED STATES PATENT OFFICE 2,371,281

LACTYLLACTIC ESTERS AND PROCESS OF MAKING SAME

Houston V. Claborn, Arlington, Va.; dedicated to the free use of the People in the territory of the United States No Drawing. Application October 25, 1943, Serial No. 507,604

3 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to lactyllactic esters of the series having the structural formula,

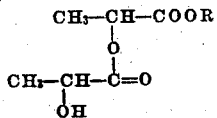

where R is an alkyl group or substituted alkyl group.

The object of the invention is the preparation of a series of new and useful lactyllactic esters which are colorless, odorless liquids of high molecular weights and low vapor pressures having properties desirable for solvents and plasticizers and also having properties which render the series desirable for use in the preparation of other plasticizers, which forms the subject-matter of Patent No. 2,350,388, granted June 6, 1944.

It is known that ethyl lactyllactic ester can be prepared by reacting ethyl alpha chloropropionate with potassium lactate. However, this process is too tedious and complicated to be of commercial value.

According to this invention, lactyllactic esters of mono or polyhydric alcohols can be easily prepared in yields which are practically quantitative by reacting dry lactide with an anhydrous alcohol in the presence of an acid catalyst, such as sulphuric acid, hydrochloric acid, benzene sulphonic acid, and so forth.

In general, the esters are produced by heating a mixture of the dry lactide and the desired anhydrous alcohol at a temperature of about from 70° to 90° C. for a period of about from 6 to 8 hours in the presence of the acid catalyst under anhydrous conditions. An excess of the alcohol may be used to provide a solvent, or the alcohol and lactide may be used in equal molecular proportions and an inert organic liquid, such as benzene, used as the solvent in the reaction mixture.

Under these conditions, lactide is caused to react with alcohol in such a way that only one of the ester groups in the lactide ring is affected by the alcoholysis reaction, as represented by the reaction equation,

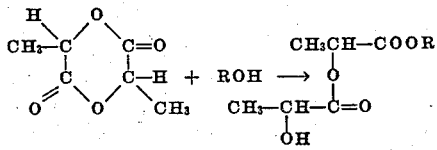

Methyl, ethyl, butyl, hexyl, phenylethyl, and tetrahydrofurfuryl alcohols, and ethylene glycol are given as examples of alcohols which may be used, but the invention is not limited to these, as any alcohol, primary, secondary or tertiary, may be employed.

The invention is specifically exhibited by the following examples:

Example I

Seventy-two grams of lactide, previously dried over calcium chloride in a vacuum desiccator at 0.1 mm. pressure, 150 cc. of anhydrous ethyl alcohol, and a trace of benzene sulphonic acid were heated under a reflux condenser, provided with a calcium chloride drying tube, at 70° C. for 6½ hours. The excess alcohol was then removed by distillation and the residue fractionated at reduced pressure.

The first fraction, which distilled at 40° to 110° C. at 7.5 mm. pressure, weighed 5.0 g.

The second fraction, a colorless, odorless, and slightly viscous liquid, which distilled at 110° to 113° C. at 7.5 mm. pressure, weighed 78 g., and was identified as ethyl lactyllactate, $$CH_3CH(CH_3CHOHCOO)COOC_2H_5$$

It had a specific gravity of about 1.1127 at 25° C. and a refractive index for the yellow sodium line of about 1.4294 at 20° C.

Example II

Seventy-two grams of dry lactide, 25 cc. of anhydrous methyl alcohol, 50 cc. of dry benzene and 1 drop of concentrated sulphuric acid were heated under a reflux condenser, provided with a calcium chloride drying tube, at 70° to 75° C. for 7½ hours. The benzene and excess methyl alcohol were then removed and the residue fractionated at reduced pressure.

The first fraction, which distilled at 40° to 107° C. at 7.8 mm. pressure, weighed 6 g.

The second fraction, a colorless, oily liquid at 25° C., which distilled at 107° C. at 7.8 mm. pressure, weighed 73 g., and was identified as methyl lactyllactate, $CH_3CH(CH_3CHOHCOO)COOCH_3$.

It had a specific gravity of about 1.1561 at 25° C., and a refractive index for the yellow sodium line of about 1.4313 at 20° C.

*Example III*

Seventy-two grams of dry lactide, 49 g. of ethylene glycol, 65 cc. of dry benzene and 1 drop of concentrated sulphuric acid were heated under a reflux condenser, provided with a calcium chloride drying tube, at 80° C. for 7½ hours. The benzene was then removed by distillation at 10 mm. pressure and the excess ethylene glycol was removed by distillation up to 105° C. at 1.3 mm. pressure, resulting in a fraction weighing 19 g.

The residue, beta-hydroxyethyl lactyllactate,

weighed 98 g. This viscous, water-soluble liquid could not be distilled without decomposition. It was identified from its water-insoluble diacetyl derivative which was purified by washing with water.

*Example IV*

One hundred forty-four grams of dry lactide, 88 g. of anhydrous n-butyl alcohol, 50 cc. of dry benzene, and a trace of benzene sulphonic acid were heated under a reflux condenser, provided with a calcium chloride drying tube, at 85° to 90° C. for 7½ hours. The benzene and excess butyl alcohol were then removed at reduced pressure and the residue fractionated.

The first fraction, which distilled up to 93° C. at 0.9 mm. pressure, weighed 18 g.

The second fraction, a colorless, oily liquid at 25° C., which distilled at 93° to 97° C., at 0.9 mm. pressure, weighed 190 g. This fraction was purified by redistillation at 99° C. at 1.3 mm. pressure, and was identified as n-butyl lactyllactate, $CH_3CH(CH_3CHOHCOO)COOC_4H_9$. It had a specific gravity of about 1.0617 at 25° C., and a refractive index for the yellow sodium line of about 1.4327 at 20° C.

Having thus described the invention, what is claimed is:

1. A process of preparing an ester of lactyllactic acid comprising reacting dry lactide with an anhydrous alcohol in excess of the molecular proportion in the presence of an acid catalyst under anhydrous conditions at a temperature of about from 70° to 90° C., and removing the excess alcohol.

2. A process of preparing an ester of lactyllactic acid comprising reacting dry lactide with an anhydrous alcohol in excess of the molecular proportion in the presence of an acid catalyst under anhydrous conditions at a temperature of about from 70° to 90° C., removing the excess alcohol, and separating the ester from the reaction product by fractional distillation.

3. A process of preparing an ester of lactyllactic acid comprising reacting dry lactide with about an equal molecular proportion of an anhydrous alcohol in the presence of an acid catalyst under anhydrous conditions in an inert organic solvent at a temperature of about from 70° to 90° C., removing any solvent and the unreacted alcohol, and separating the ester from the residue by fractional distillation.

HOUSTON V. CLABORN.